July 1, 1958   J. C. WARD   2,841,414
ANTI-BRAKE-HOP STRUCTURES FOR WHEELED VEHICLES
Filed March 2, 1954   3 Sheets-Sheet 1
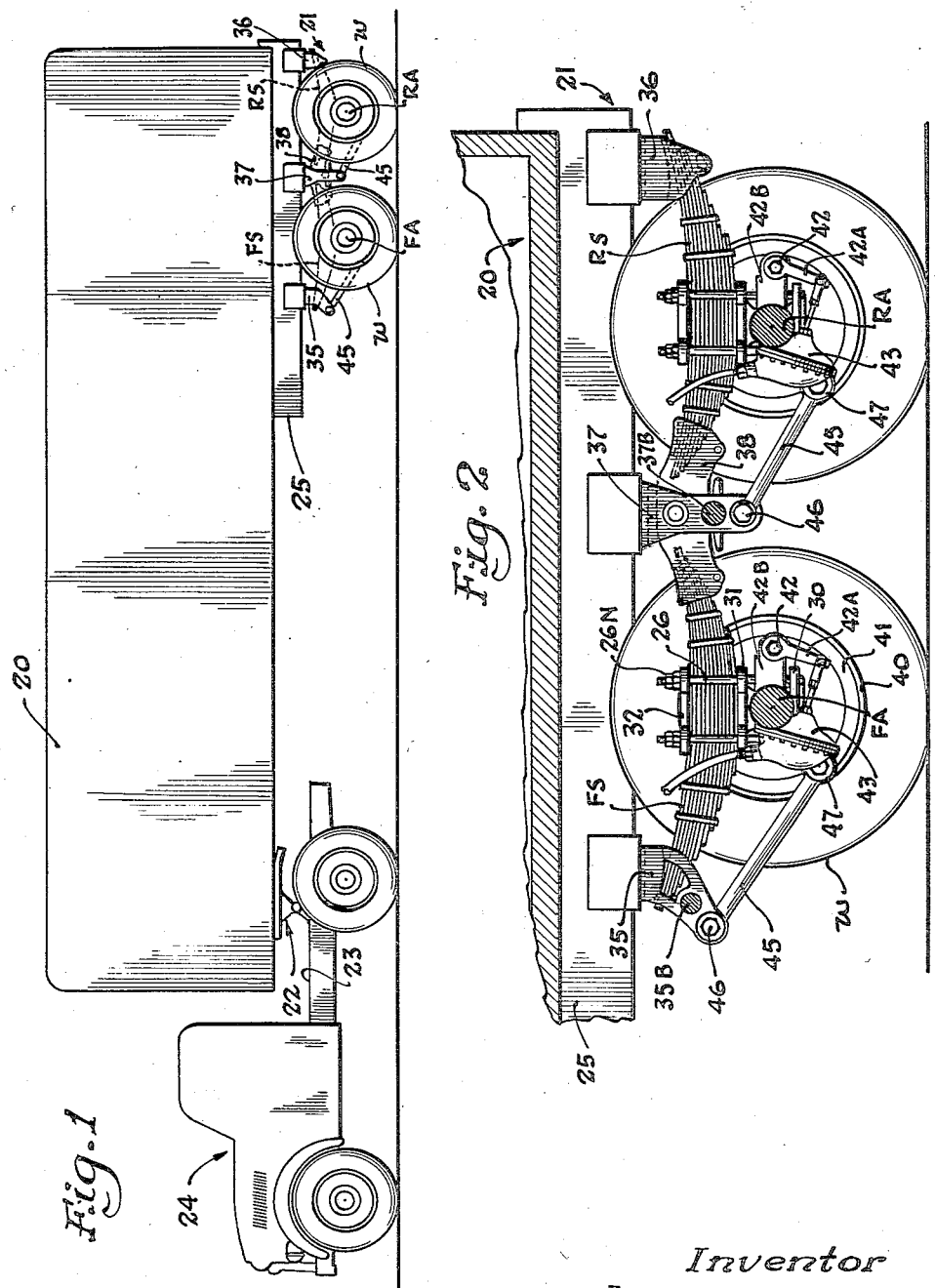
Inventor
James C. Ward
By Wallace and Cannon
Attorneys Inventor
James C. Ward
By Wallace and Cannon
Attorneys Inventor
James C. Ward
By Wallace and Cannon
Attorneys

United States Patent Office 2,841,414
Patented July 1, 1958

2,841,414

ANTI-BRAKE-HOP STRUCTURES FOR WHEELED VEHICLES

James C. Ward, Springfield, Mo., assignor, by mesne assignments, to Alaska Juneau Gold Mining Company, Los Angeles, Calif., a corporation of West Virginia Application March 2, 1954, Serial No. 413,636

12 Claims. (Cl. 280—104.5)

This invention relates to trailer constructions of the heavy duty type, and particularly to tandem running gear used therein to support the trailer.

Heavy duty trailers of the kind used in heavy duty highway transport work usually embody a tandem running gear which has two spaced independently sprung axles that have load equalizing connections so that in normal road operation, the load will be substantially equalized on the two axles. While spring means operating on a torque principle have recently been introduced in this field, the majority of heavy duty trailers now in use employ semi-elliptic springs, and such semi-elliptic springs are considered by many users to have superior riding or load supporting characteristics. In the most widely accepted forms of equalized semi-elliptic tandem spring suspensions, the springs are fixedly secured to the axles by simple and economical spring seats and U-bolt fasteners, while simple and effective torque arms are used to attain and preserve the desired axle alignment, and these features of structure are highly desirable by reason of their low cost in both manufacture and upkeep. The means for equalizing the load between the front and rear axles of such prior tandems has taken different forms, a rocking equalizer being employed in some instances between the adjacent ends of the front and rear semi-elliptic springs, while in other instances motion transmitting equalizing linkages have been afforded between other portions of the front and rear springs.

As pointed out hereinabove, such equalized semi-elliptic spring suspensions in tandem running gear have been recognized as having highly desirable characteristics insofar as road operation, initial cost and simplicity and economy of upkeep may be concerned, and it is the primary object of the present invention to enable further improvements in the operation of such structures to be attained, and to enable this to be done in such a way as to preserve those structural and operational characteristics which have been found to be desirable therein.

More specifically, the primary improvements contemplated and made possible by the present invention are enhanced braking effectiveness, the elimination of the phenomena known in the trucking industry as "brake hopping," and the improvement of the riding characteristics of the trailer, as well as the tractor, during braking operations. Such brake hop is experienced primarily with unloaded or lightly loaded trailers when a sudden or emergency braking operation is in progress, and the phenomena is characterized primarily by rapid and extremely violent up and down oscillation of either one or both of the axles of the tandem. In what is probably its most common form, this phenomena primarily involves or is exhibited in a readily apparent manner in vibration or oscillation of the front axle, and the vibration is often so great that in each oscillation the wheels of this axle are lifted from the road in an appreciable amount and then returned to road contact with great force or impact. Moreover, during the braking period when such brake hop occurs, the equalizer is ineffective and the weight of the trailer is supported primarily by the rear axle. The violent oscillations that are thus experienced in brake hop involve forces of great magnitude, with the result that shaking and pounding of the equipment causes highly objectionable strain on the driver and tends toward breakage or damage to the equipment, and it is to enable such objectionable action to be eliminated that the present invention is directed.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a side elevational view of a tractor-trailer unit in which the present invention has been embodied;

Fig. 2 is an enlarged side elevational view of the running gear;

Figure 3:
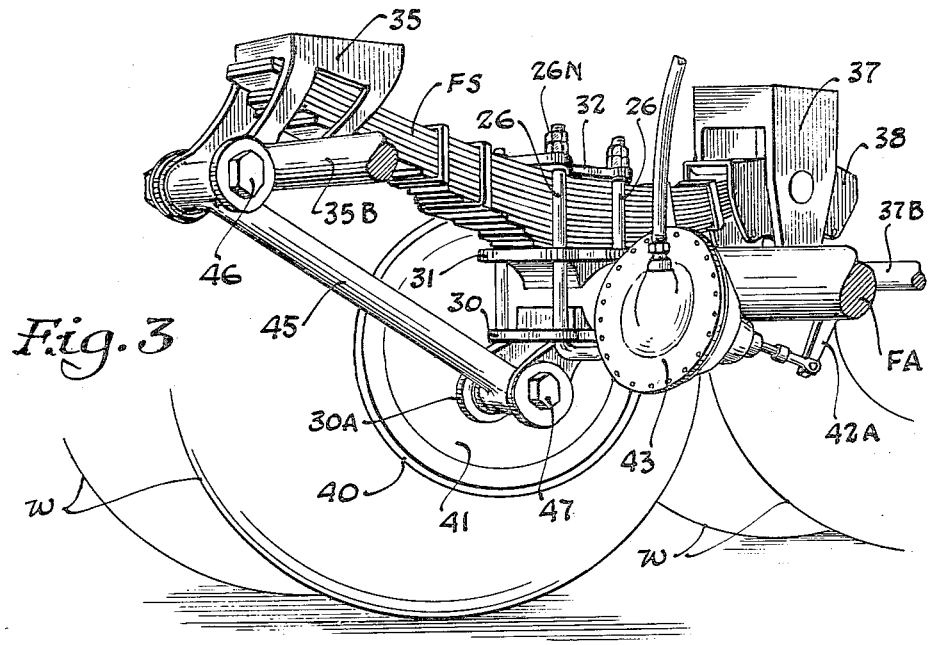
Fig. 3 is a front perspective view of the inside faces of the right-hand wheels of the running gear.
Figure 4:
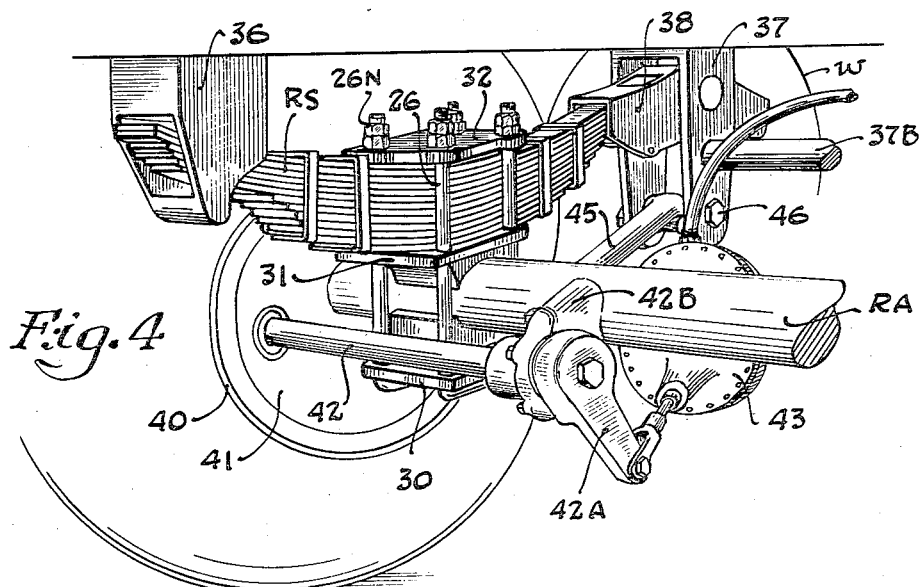
Fig. 4 is a rear perspective view of the inside faces of the left-hand wheels of the running gear.
Figure 5:
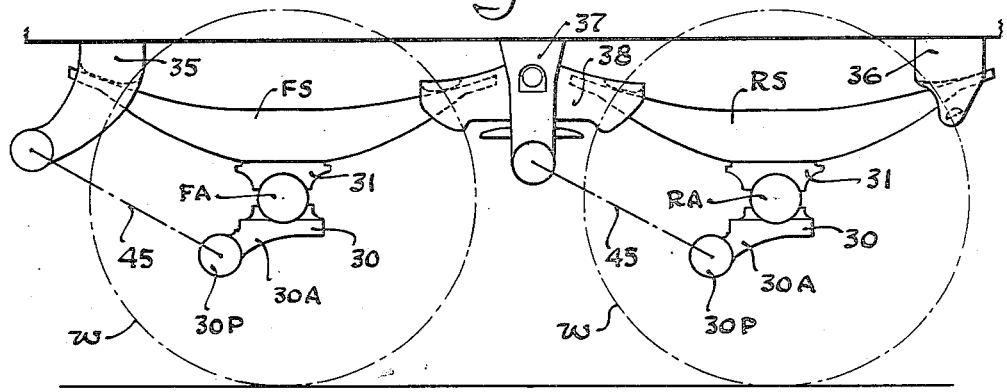
Fig. 5 is a schematic side elevational view of the running gear.

For purposes of disclosure, the invention is herein illustrated as embodied in a heavy duty trailer 20, the rear end of which is supported by a tandem 21, while the front end is supported through a conventional fifth wheel coupler 22 on the rear deck 23 of a conventional tractor 24.

The tandem 21 is associated with the trailer 20 by means of a conventional running gear frame 25, and the tandem embodies a front axle FA and a rear axle RA that are related to the frame 25 by equalized spring means of the semi-elliptic type as will be described in detail hereinafter. As herein shown, double wheels W are rotatably mounted on each end of each axle, and adjacent each end of each axle, a semi-elliptic spring FS or RS is fixedly secured to the axle by means of U-bolts 26 and a series of clamp plates. This clamping arrangement is similar for the several springs, and will be described with reference to a front spring FS, as shown in Fig. 3. Thus, a lower axle plate 30 embraces the lower surfaces of the axle FA, an upper axle plate 31 embraces the upper surfaces of the axle FA and has its flat upper surface engaged by the central portion of the lower or convex face of the spring FS, while an upper clamp plate 32 rests on the slightly concave upper face of the central portion of the spring FS, and a pair of U-bolts 26 extend upwardly on opposite sides of the spring FS and have fastening nuts 26N on their upper ends to clamp the axle FA and the spring FS in a fixed relation.

In relating the front and rear springs FS and RS to the running gear frame 25, an equalizing means is afforded, and as herein shown, this equalizing means is disposed between the adjacent ends of the springs FS and RS on the two sides of the running gear. Thus a front hanger bracket 35 is fixed in a depending relation on the frame 25 to receive the front end of each front spring FS in the conventional manner, while a rear hanger bracket 36 is fixed in a depending relation on the frame 25 to receive the rear end of each rear spring RS in the conventional manner, and intermediate the hangers 35 and 36, equalizing hanger brackets 37 are mounted, so that a rocking equalizer 38 may engage the adjacent ends of the front and rear springs FS and RS in a conventional equalizing relation. The two front hangers 35 are connected by a transverse brace rod 35B, while the two equalizing hanger brackets 37 are connected by a transverse brace rod 37B, according to usual practice.

The wheels W of both axles are provided with brake means according to usual practice, and, as herein shown, the brake means are of the air-operated type. Thus each inner wheel W has a brake drum 40 that is closed at its inner side by a conventional brake flange 41 upon which the usual brake shoe mechanism is mounted within the drum 40 for braking cooperation with the internal drum surface under control of a conventional brake-operating rock shaft 42. This rod 42 for each wheel is mounted on the related axle in a parallel relation thereto by means of a bracket 42B, and has an operating arm 42A thereon whereby the rock shaft 42 is operatively associated with its brake-operating cylinder 43 that is mounted in fixed relation on the adjacent axle in the usual way.

Figure 6:
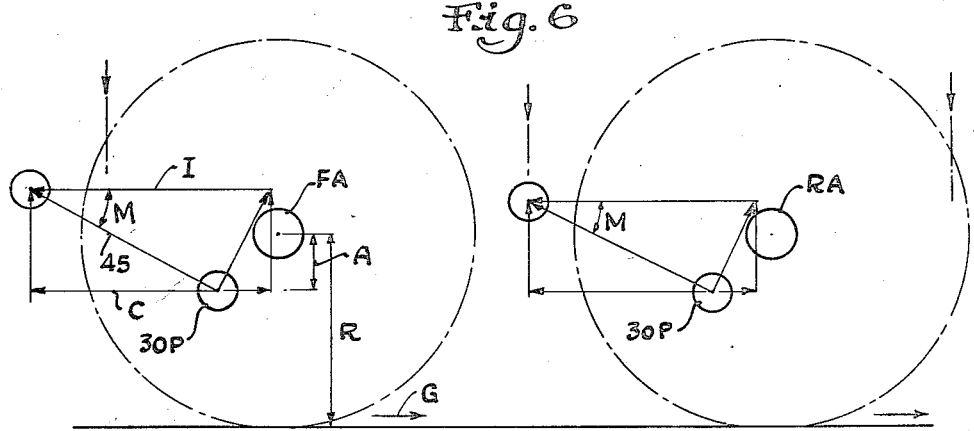
Fig. 6 is a schematic force diagram showing the forces that come into play in a braking operation.
Figure 7:
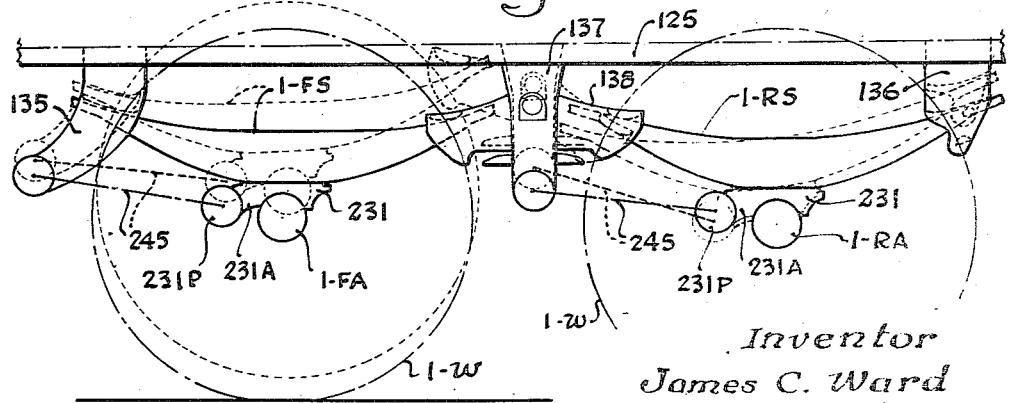
Fig. 7 is a view that diagrammatically illustrates the objectionable brake hopping action attained in prior tandems.

In order that the advantageous simplicity and effectiveness of the present brake-hop preventing means may be fully appreciated, one of the usual forms of prior tandems has been illustrated diagrammatically in Fig. 7 of the drawings, and one of the most frequent objectionable oscillating movements of the elements of this prior structure has been shown by dotted line representations of the changed positions assumed by these elements. In respect to the prior art structure shown in Fig. 7, reference characters have been employed which add the prefix "1" to the reference characters of the generally corresponding elements used in the embodiment of my invention illustrated in Figs. 1 to 6, and where any material difference in structure or relationship is present, the prefix "2" will be employed. Thus, it will be observed that an upper axle plate 231 is employed in each instance which has a forwardly projecting arm 231A that affords a pivotal bearing 231P located forwardly of and slightly above the center-line or axis of the related axle 1–FA or 1–RA. Each pivot bearing 231P serves as the usual connection for the rear end of a conventional torque arm 245, the torque arms 245 of the front axle 1–FA being pivoted at their front ends on the lower ends of the brackets 135, while the front ends of the torque arms 245 of the rear axle 1–RA are pivoted to the lower ends of the equalizer bracket 137 in the usual manner, adjustable torque pivots being employed at each end of each torque arm as is usual.

With prior structures of the kind that have been shown in Fig. 7, a braking operation, particularly a heavy or emergency operation, results in objectionable brake-hop, which often involves violent oscillating movements of the elements of the running gear between two positions such as those illustrated in Fig. 7, the violence and amplitude or extent of such oscillations varying, of course, with variations in the load, braking intensity, tire-to-road friction and like variables. This objectionable brake-hopping action in prior tandems such as that illustrated in Fig. 7, has been due of course to the unusual and extremely great forces that come into play in the tandem as a result of the braking operation, and these forces, and their objectionable action on the tandem may be best understood by a consideration of a sudden or emergency braking operation wherein the wheels are fully stopped and locked with respect to their axles. Under such circumstances, the tires initially have a sliding contact with the road which of course tends to rotate the wheel, and the axle to which it is locked, in a forward rotational direction. It is these forward rotational forces that are applied to the axles that tend to disrupt the normal relationship of the wheels and springs with respect to the frame and which thus act to cause brake hop.

Thus, as applied to the prior art structures of Fig. 7, such forward rotational forces on the front axle 1–FA cause the rear ends of the front spring to move upwardly so as to tilt the equalizer 138 in a clockwise direction, and this tilting of the equalizer is augmented by the forward rotational forces acting on the rear axle 1–RA which of course tend to shift the front ends of the rear spring 1–RS in a downward direction. The changed positions toward which the parts tend to move under such circumstances are shown in dotted outline in Fig. 7, and the net result of such movements is to shift, or tend to shift, the weight of the rear portion of the trailer entirely onto the rear axle 1–RA. This shifting of the load to the rear axle, coupled with the reduction, or total elimination, of the frictional contact between the front wheels and the road, then tend to return the front wheels to their load bearing relation in frictional contact with the road, and such changes or reversals of the forces take place with a definite periodicity or frequency that is determined by the variable factors mentioned hereinabove. The net result of such periodic reversals or changes in the effective forces in most instances is to set up a violent vertical oscillation of the front axle 1–FA, and in some instances, alternate or out-of-phase oscillations of both axles. This violent oscillation of the extremely heavy parts of the tandem causes corresponding or related oscillations of the trailer body, and in actual use of prior tandems of the general type shown in Fig. 7, the shaking and pounding effect is transmitted through the fifth wheel 22 to the tractor 24 so as to cause considerable discomfort to the driver. This, of course, is undesirable as is the physical damage that is done to the equipment and to the load by the pounding action incident to such brake hop.

Under and in accordance with the present invention, this objectionable brake hopping tendency is eliminated through resort to an extremely simple change in the physical relationship of the structural elements of the tandem. Thus, in accomplishing the foregoing, resort is had to torque rods 45 which follow known standards of form and size, but under the present invention, such torque rods 45 are connected in a different and highly advantageous relationship between the frame and the respective axles. Thus, one end of each torque rod 45 is pivotally connected to the lower end of the related spring hanger or bracket, as by an adjustable torque joint 46 of any conventional form, while the other ends of the torque rods 45 are connected by similar adjustable torque joints 47 to the lower connecting plates 30 that are fixed to the axle, and in order to eliminate the objectionable brake hop under the present invention, the lower or rear torque joints 47 that connect the torque rods 45 to the axle are located a substantial distance below the axis of the axle, as shown in Figs. 1 to 6 of the drawings. Such location of the lower or rear torque joints 47 is attained in the present instance by providing forwardly and downwardly projecting arms 30A on the lower axle plates 30, thus to afford pivot points 30P at the lower forward ends of the arms 30A to receive the rear or lower torque joints 47.

Through the above described simple change in the relationship of the torque arms 45 to the respective axles, I have discovered that forces are applied to the axles which tend to balance or counteract each other so that the tendency that has heretofore been encountered for the axles to rotate in a forward direction in the course of a heavy braking operation is, for all practical purposes, eliminated. The result of this is that brake hop is eliminated and the wheels of the tandem are maintained continuously and substantially uniformly in contact with the road so that the overall braking efficiency is materially increased while, at the same time, eliminating jolting and other discomforts to the driver and avoiding damage to the trailer and the load carried thereby. This result is attained because with the structural arrangement of the present invention, the inertia of the trailer is utilized to apply counter or reverse rotative forces to the axles. Thus, as has been described in a general way hereinbefore, the forces applied between the lower edge of the tire and the road may be said to constitute a force G acting rearwardly at the lower surface of the wheel as indicated in Fig. 6 of the drawings, and this force G acts through a lever arm R so as to apply the previously described forward rotative forces to the axle, it being kept in mind of course that during a heavy or emergency braking operation, the brake means serve to lock the wheels to the axles. As hereinbefore pointed out, this forward rotative moment that results from the application of the force G to the tire, is the thing that tends to initiate the objectionable brake hop action, and through the use of the present invention, this forward rotative moment is counteracted by forces applied through the torque rods 45 to the pivots 30P as indicated in Fig. 6, so that such inertia forces produce a reverse or counteracting rotative moment in the axle. The force that is effective in this respect constitutes a proportional part of the forward inertia I, as indicated in Fig. 6 of the drawings, and in Fig. 6, a force diagram has been shown which resolves the force I into its horizontal component C acting forwardly from the pivot 30P and through a lever arm A that is indicated in Fig. 6. By locating the pivot point 30P a substantial distance below the axis of the axle, this reverse rotative moment that results from the application of the inertia force I is caused to substantially equal the maximum forward rotative moment that may be applied to the axle. The angle M at which the torque rod 45 extends downwardly and rearwardly from its forward pivot may, of course, vary to some extent in different tandem structures, and this will, of course, vary the resultant force C for any particular value of the forward inertia I, and depending upon this angle M, the lever arm A may need to be varied somewhat so as to produce the desired counteracting or counter-balancing action. In this respect, however, it should be kept in mind that absolute balancing or counter-balancing of the forward rotative moment is not essential to successful operation of the present invention, it being essential only that the pivot point 30P be located a sufficient distance below the axis of the axle to approximately counter-balance the forward rotative moments under average or normal operation condition. Under most circumstances, the desired corrective action may be obtained by making the downwardly extending lever arm A equal to approximately one-third of the radius R, as herein shown.

In actual comparative tests, it has been found that with the pivot point 30P located substantially as shown in Figs. 1 to 6 of the drawings, an emergency braking operation may be performed without any perceptible tendency toward brake hop. Actually, with the structure shown in Figs. 1 to 6, all of the tires of the front and rear wheels of the tandem maintain constant and uniform contact with the road surface throughout the braking operation, thus to minimize the stop distance required. There is no brake hop, and, of course, there is no jolting of the trailer and the load, and no jolting or other discomfort to the driver.

From the foregoing description it will be apparent that the present invention enables the operation of heavy duty trailers to be materially improved, and this improvement is attained through an extremely simple and inexpensive structural change. Furthermore, it will be apparent that through the use of the present invention, proper braking is assured in every instance, and emergency stops may be made within the minimum distance. Moreover, it will be apparent that the present invention eliminates the possibility of damage to trailers during emergency braking operations, and it also prevents discomfort to the driver.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a tandem for a vehicle, a supporting frame, a pair of semi-elliptic front springs having a front axle connected thereto and a pair of semi-elliptic rear springs having a rear axle connected thereto, wheels on said axles, brake means effective between said axles and said wheels for applying braking forces to said wheels, means mounting said springs beneath said frame in a load equalizing relation, lower torque rod means only for said axles and each pivotally connected at the forward end to said frame, and connecting arms rigidly connected to said axles and pivotally connected to the respective rear ends of said torque rod means on axes located a substantial distance below the related axles, whereby otherwise unrestricted inertia forces of the vehicle attendant to braking are applied to said arms below the axes of the axles thereby precluding brake hopping.

2. In a tandem for a vehicle, a supporting frame, a pair of semi-elliptic front springs having a front axle connected thereto and a pair of semi-elliptic rear springs having a rear axle connected thereto, wheels on said axles, brake means effective between said axles and said wheels for applying braking forces to said wheels, means mounting said springs beneath said frame in a load equalizing relation, and lower torque rod means only for said axles connected at their forward ends to said frame and at their rearward ends to said axles at points below the axles to apply otherwise unrestricted inertia forces of the vehicle attendant to braking from said frame to said axles in a direction corresponding to rearward rotation of said wheels thereby precluding brake hopping.

3. In a tandem for a vehicle, a supporting frame, a pair of semi-elliptic front springs having a front axle connected thereto and a pair of semi-elliptic rear springs having a rear axle connected thereto, wheels on said axles, brake means effective between said axles and said wheels for applying braking forces to said wheels, means mounting said springs beneath said frame including load equalizing means acting between the front end of one spring and the rear end of the other spring on each side of the tandem, lower torque rod means only for said axles and each pivotally connected at its forward end to said frame, and connecting arms rigidly connected to said axles and pivotally connected to the respective rear ends of said torque rod means on axes located a substantial distance below the related axles to apply otherwise unrestricted inertia forces of the vehicle attendant to braking to said arms below the axes of the axles thereby precluding brake hopping.

4. In a tandem for a vehicle, a supporting frame, a pair of semi-elliptic front springs having a front axle connected thereto and a pair of semi-elliptic rear springs having a rear axle connected thereto, wheels on said axles, brake means effective between said axles and said wheels for applying braking forces to said wheels, means mounting said springs beneath said frame including load equalizing means acting between the front of the rear spring and the rear end of the front spring on each side of the tandem, lower torque rod means only for said axles and each pivotally connected at its forward end to said frame, and connecting arms rigidly connected to said axles and pivotally connected to the respective rear ends of said torque rod means on axes located a substantial distance below the related axles to apply otherwise unrestricted inertia forces of the vehicle attendant to braking to said arms below the axes of the axles thereby precluding brake hopping.

5. In a tandem for a vehicle, a supporting frame, a pair of semi-elliptic front springs having a front axle connected thereto and a pair of semi-elliptic rear springs having a rear axle connected thereto, wheels on said axles, brake means effective between said axles and said wheels for applying braking forces to said wheels, means mounting said springs beneath said frame including load equalizing means acting between the front end of one spring and the rear end of the other spring on each side of the tandem, and lower torque rod means only for said axles connected at their forward ends to said frame forwardly of the axles and at their rearward ends to said axles to apply inertia forces of the vehicle attendant to braking from said frame to said axles at points below said axles and in a direction tending to rotate said axles in a rotative direction corresponding to rearward rotation of said wheels thereby precluding brake hopping.

6. In a tandem for a vehicle, a supporting frame, a pair of semi-elliptic front springs having a front axle connected thereto and a pair of semi-elliptic rear springs having a rear axle connected thereto, wheels on said axles, brake means effective between said axles and said wheels for applying braking forces to said wheels, means mounting said springs beneath said frame including load equalizing means acting between the front of the rear spring and the rear end of the front spring on each side of the tandem, lower torque rods only for said axles, each torque rod in the tandem being connected at its front end to said frame, and connecting arms depending from each such axle at opposite ends thereof, each torque rod in the tandem being connected at its rear end to a related one of said connecting arms to apply inertia forces of the vehicle attendant to braking from said frame to said axles at points below said axles and in a direction tending to rotate said axles in a rotative direction corresponding to rearward rotation of said wheels thereby precluding brake hopping.

7. A tandem spring suspension for tandem front and rear axles of a vehicle wherein wheels having braking means associated therewith are mounted at the ends of the axles, said suspension including two pairs of elongated springs, the springs in each such pair being adapted to be disposed in tandem relation one relative to the other, means for connecting adjacent inner ends of the springs in load equalized relation and the opposed outer ends of the springs to the frame of the vehicle for free movement of the ends of the springs away from the frame, means for connecting one of said springs in each pair of springs substantially at the medial portion thereof to the front axle of the vehicle below the frame thereof and the other of said springs in each pair of springs substantially at the medial portion thereof to the rear axle of the vehicle below the frame thereof, lower torque rod means only associated with each spring, means for connecting the front ends of the torque rod means to the frame of the vehicle forwardly of each axle, and rigid arms rigidly secured to the axles and pivotally connected to the rear ends of said torque rod means below the axes of the axles, whereby said torque rod means serves as the effective means for restraining turning moment induced in the axles during normal operation as well as during braking and are effective to apply otherwise unrestricted inertia forces of the vehicle attendant to braking to said arms below the axes of the axles precluding brake hopping.

8. A tandem spring suspension for tandem front and rear axles of a vehicle having a frame and wherein wheels having braking means associated therewith are mounted at the ends of the axles beneath the frame, said suspension including two pairs of elongated springs, one pair on each side of the frame, the springs in each such pair being disposed in tandem relation one relative to the other, means connecting adjacent inner ends of the springs to the frame in load equalized relation and bracket means connecting the opposed outer ends of the springs to the frame of the vehicle for free movement of the ends of the springs away from the frame, means connecting one of said springs in each pair of springs substantially at the medial portion thereof to the front axle of the vehicle below the frame thereof and the other of said springs in each pair of springs substantially at the medial portion thereof to the rear axle of the vehicle below the frame thereof, lower torque rod means only associated with each spring, means connecting the front ends of each of said torque rod means to the frame of the vehicle forwardly of each axle, and arms rigidly secured to the axles and pivotally connected to the rear ends of each of said torque rod means below the axes of the related axles, said arms each being rigidly connected to said axles, said torque rod means and arms being the sole effective means for translating inertia forces of the vehicle, attendant to braking during forward motion of the vehicle, into clockwise or rearward rotative moment of both of said axles which resists counterclockwise or forward rotative moment of said axles otherwise normally occurring at the time of braking.

9. A spring suspension for spaced apart rear axles of a vehicle that includes a frame and wherein wheels having braking means associated therewith are mounted at the ends of each of the axles, said suspension including two pairs of springs to afford a set for each side of the vehicle frame, the springs in each set being disposed one behind the other in load equalized relation and being adapted to be secured to the side of the frame of the vehicle for movement of the ends thereof away from said frame, means for connecting the springs in each pair thereof to the forwardly disposed of the spaced axles and the springs of the other pair to the rearwardly disposed of the spaced axles so that the axles lie in a predetermined plane beneath the vehicle frame when the springs are attached to the vehicle frame, lower torque rod means only for the axles and respectively associated with and related to each spring, securing means for connecting the front end of each torque rod means to the vehicle frame forwardly of the axle connected to the related spring, arms at the rear end of each torque rod means rigidly secured to the axle connected to the related spring so as to depend below such axle and forwardly thereof, the securing means when connected to the vehicle frame as aforesaid, the torque rod means and the arms when disposed relative to the axles as aforesaid being the means for restraining otherwise unrestricted rotative moment induced in the axles during operation of the spring suspension when the same are connected to a vehicle frame and also being the effective means to translate inertia forces of the vehicle into clockwise or rearward rotative moment of both axles which resists counterclockwise or forward rotative moment induced in the axles attendant to braking during forward motion of the vehicle to thereby restrain said axles against substantial displacement from the aforesaid predetermined plane in which the same are disposed to thereby preclude the aforesaid forward rotative moment in the axles from imposing the vehicle load on the rear axle and unloading of the forward axle so as to thereby prevent brake hopping.

10. A tandem spring suspension for spaced apart rear axles of a vehicle that includes a frame and wherein wheels having braking means associated therewith are mounted at the ends of each of the axles, said suspension including two pairs of spring means to afford a set for each side of the vehicle frame, the springs in each set being disposed one behind the other, supporting means for supporting from the frame of the vehicle the springs of each set in load equalized relation and for movement of the ends thereof away from the frame of the vehicle, means for connecting the springs in each pair thereof substantially at the medial portions thereof to the forwardly disposed of the spaced axles and the other springs of each pair thereof substantially at the medial portions thereof to the rearwardly disposed of the spaced axles so that the axles lie in a predetermined plane beneath the vehicle frame when the springs are attached to the vehicle frame as aforesaid, lower torque rod means only for the axles and respectively associated with and related to each spring, securing means for connecting the front end of each torque rod means to the vehicle frame forwardly of the axle connected to the related spring, arms at the rear end of each torque rod means rigidly secured to the axle connected to the related spring so as to depend below such axle, the securing means when connected to the vehicle frame as aforesaid, the torque rod means and the arms when connected to the axles as aforesaid being the effective means for restraining otherwise unrestricted rotative moment induced in the axles during operation of the spring suspension when the same is connected to a vehicle frame and also being the means effective to translate inertia forces of the vehicle into clockwise or rearward rotative moment of both axles which resists counterclockwise or forward rotative moment induced in the axles attendant to braking during forward motion of the vehicle to thereby restrain said axles against substantial displacement from the aforesaid predetermined plane in which the same are disposed to thereby preclude the aforesaid forward rotative moment in said axles from imposing the vehicle load on the rear axle and unloading the forward axle so as to thereby prevent brake hopping.

11. A tandem spring suspension for spaced apart rear axles of a vehicle that includes a frame and wherein wheels having braking means associated therewith are mounted at the ends of each of the axles, said suspension including two pairs of elongated springs to afford a set for each side of the vehicle frame, the springs in each set being disposed one behind the other, load equalizing means for supporting from the frame of the vehicle the adjacent inner ends of the springs in each set in load equalized relation and bracket means for supporting from the vehicle frame the opposed outer ends of the springs of each set thereof and for movement away from the frame of the vehicle, means for connecting the springs in each pair thereof substantially at the medial portions thereof to the forwardly disposed of the spaced axles and the other springs of each pair thereof substantially at the medial portions thereof to the rearwardly disposed of the spaced axles so that the axles lie in a predetermined plane beneath the vehicle frame when the springs are attached to the vehicle frame as aforesaid, lower torque rod means only for the axles and respectively associated with and related to each spring, securing means for connecting the front end of each torque rod means to the vehicle frame forwardly of the axle connected to the related spring, arms at the rear end of each torque rod means rigidly secured to the axle connected to the related spring so as to depend below such axle, the securing means when connected to the vehicle frame as aforesaid, the torque rod means and the arms when connected to the axles as aforesaid being the effective means for restraining otherwise unrestricted rotative moment induced in the axles during operation of the spring suspension when the same is connected to a vehicle frame and also being the means effective to translate inertia forces of the vehicle into clockwise or rearward rotative moment of both axles which resists counterclockwise or forward rotative moment induced in the axles attendant to braking during forward motion of the vehicle to thereby restrain said axles against substantial displacement from the aforesaid predetermined plane in which the same are disposed to thereby preclude the aforesaid forward rotative moment in said axles from imposing the vehicle load on the rear axle and unloading the forward axle so as to thereby prevent brake hopping.

12. A spring suspension for spaced apart rear axles of a vehicle that includes a frame and wherein wheels having braking means associated therewith are mounted at the ends of each of the axles, said suspension including two pairs of elongated springs to afford a set for each side of the vehicle frame, the springs in each set being disposed one behind the other, load equalizing means for supporting from the frame of the vehicle the adjacent inner ends of the springs in each set in load equalized relation beneath the frame of the vehicle and bracket means secured to the side of the frame of the vehicle and supporting the outer ends of the springs in each set of springs for free movement away from the frame of the vehicle, means connecting the springs in each pair thereof substantially to the medial portions of the forwardly disposed of the spaced axles and the springs of the other pair substantially to the medial portions of the rearwardly disposed of the spaced axles so that the axles lie in a predetermined plane beneath the vehicle frame, lower torque rod means only for the axles and respectively associated with and related to each spring, securing means connecting the front end of each torque rod means to the vehicle frame forwardly of the axles connected to the related spring, arms at the rear end of each torque rod means and rigidly secured to the axle connected to the related spring so as to depend below such axle and forwardly thereof, the securing means when connected to the vehicle frame as aforesaid, the lower torque rod means and the arms when disposed relative to the axles as aforesaid being the effective means for restraining otherwise unrestricted rotative moment induced in the axles during operation of the spring suspension and also being the means effective to translate inertia forces of the vehicle into clockwise or rearward rotative moment of both axles which resists counterclockwise or forward rotative moment induced in the axles attendant to braking during forward motion of the vehicle to thereby restrain said axles against substantial displacement from the aforesaid predetermined plane in which the same are disposed to thereby preclude the aforesaid forward rotative moment in the axles from imposing the vehicle load on the rear axle and unloading the forward axle so as to thereby prevent brake hopping.

UNITED STATES PATENTS

References Cited in the file of this patent

| | | |
|---|---|---|
| 1,406,935 | Crane | Feb. 14, 1922 |
| 1,727,737 | Thorp | Sept. 10, 1929 |
| 1,745,088 | Fry | Jan. 28, 1930 |
| 2,351,001 | Buckendale | June 13, 1944 |
| 2,410,747 | Reid | Nov. 5, 1946 |
| 2,550,331 | Crookston | Apr. 24, 1951 |
| 2,577,322 | Frazier | Dec. 4, 1951 |